(12) United States Patent
Nara

(10) Patent No.: US 8,764,200 B2
(45) Date of Patent: Jul. 1, 2014

(54) PROJECTOR AND METHOD OF CONTROLLING THE SAME

(71) Applicant: Seiko Epson Corporation, Tokyo (JP)

(72) Inventor: Hiroshi Nara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 13/633,465

(22) Filed: Oct. 2, 2012

(65) Prior Publication Data

US 2014/0092367 A1   Apr. 3, 2014

(51) Int. Cl.
*G03B 21/14* (2006.01)

(52) U.S. Cl.
USPC ............................................... 353/97; 353/52

(58) Field of Classification Search
USPC .............................................. 353/52, 88, 97
See application file for complete search history.

(56) References Cited

U.S. PATENT DOCUMENTS

| | | | |
|---|---|---|---|
| 7,055,966 B2 * | 6/2006 | Momose et al. | 353/97 |
| 7,474,289 B2 | 1/2009 | Sakashita | |
| 8,107,019 B2 | 1/2012 | Shiota | |
| 8,480,236 B2 * | 7/2013 | Tadachi | 353/58 |
| 2010/0188640 A1 | 7/2010 | Nakano | |

FOREIGN PATENT DOCUMENTS

| | | |
|---|---|---|
| JP | 2010-175682 A | 8/2010 |
| WO | WO-2008-032632 | 3/2008 |

* cited by examiner

*Primary Examiner* — William C Dowling
(74) *Attorney, Agent, or Firm* — ALG Intellectual Property, LLC

(57) ABSTRACT

A projector includes a dimming device that moves a light-shielding member for shielding light to adjust the amount of light emitted from a light source, a housing that accommodates the dimming device, a temperature detection section that detects an internal temperature of the housing, and a control section that controls an adjustment state of the amount of light through the dimming device. The control section starts a control of the dimming device when the temperature detected by the temperature detection section is set to equal to or higher than a predetermined temperature.

9 Claims, 4 Drawing Sheets

PROJECTOR AND METHOD OF CONTROLLING THE SAME

BACKGROUND

1. Technical Field

The present invention relates to a projector that projects an image and a method of controlling the same.

2. Related Art

In order to improve contrast perception by extending the dynamic range of an image to be projected in projectors that modulate and project light emitted from a light source in accordance with image information, projectors capable of adjusting the amount of light emitted from a light source have been known (see, for example, JP-A-2010-175682). A projector disclosed in JP-A-2010-175682 includes a dimming device that shields source light using a rotatable light-shielding member, and adjusts the amount of the source light by rotating the light-shielding member in accordance with image information. Generally, grease (lubricant) is applied to such a dimming device in order to smoothly rotate the light-shielding member.

However, since grease hardens due to an increase in the viscosity of grease at the time of using the projector having such a configuration under the low-temperature environment, the light-shielding member is not rotated properly, and thus dimming may not function correctly.

SUMMARY

An advantage of some aspects of the invention is to solve at least a part of the problems described above, and the invention can be implemented as the following forms or application examples.

APPLICATION EXAMPLE

An application example of the invention is directed to a projector that modulates and projects light emitted from alight source in accordance with image information, including: a dimming device that moves a light-shielding member for shielding light to adjust the amount of light emitted from the light source; a housing that accommodates the dimming device; a temperature detection section that detects an internal temperature of the housing; and a control section that controls an adjustment state of the amount of light through the dimming device, wherein the control section starts a control of the dimming device when the temperature detected by the temperature detection section is set to equal to or higher than a predetermined temperature.

According to the projector, when the temperature detected by the temperature detection section is set to equal to or higher than a predetermined temperature, an initialization process for starting the control of the dimming device is performed, and thus it is possible to properly control the dimming device unlike the case in which initialization is performed in a state where the temperature is low, that is, in a state where grease applied to the dimming device hardens.

Another application example of the invention is directed to a projector that modulates and projects light emitted from a light source through a modulation section in accordance with image information, including: a dimming device, having a movable light-shielding member for shielding light, which drives the light-shielding member to adjust the amount of light emitted from the light source and input to the modulation section; and a control section that drives the light-shielding member to control an adjustment state of the amount of light, wherein a lubricant is applied to a movable portion of the dimming device, and the control section performs a control so as not to move the light-shielding member of the dimming device until an internal temperature of the projector is set to equal to or higher than a predetermined temperature and a lubrication action of the lubricant is effective when the lubricant is solidified.

When the projector and a method of controlling thereof are configured using a computer included in the projector, the above-mentioned forms and application examples can also be configured by a program for realizing the functions thereof, or a recording medium on which the program is readably recorded by the computer. As the recording medium, various mediums, which can be read by the computer, such as flexible disks or hard disks, optical disks such as a CD and a DVD, magneto-optic disks, memory cards or USB memories in which a nonvolatile semiconductor memory is mounted, and internal storage devices of the projector (semiconductor memories such as a RAM and a ROM) can be used.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of a projector that modulates and projects light emitted from a light source will be described with reference to the accompanying drawings.

A projector of the embodiment can perform an expansion process of expanding the gradation range of an image and a dimming process of adjusting the amount of light emitted from a light source. For this reason, for example, when an entirely dark image is projected, the gradation range is expanded to the white side (bright side), and the amount of light is reduced in accordance with the amount of expansion, so that it is possible to increase the number of effective gradations (extend the dynamic range) while maintaining the darkness of an image, and to improve contrast perception.

Figure 1:
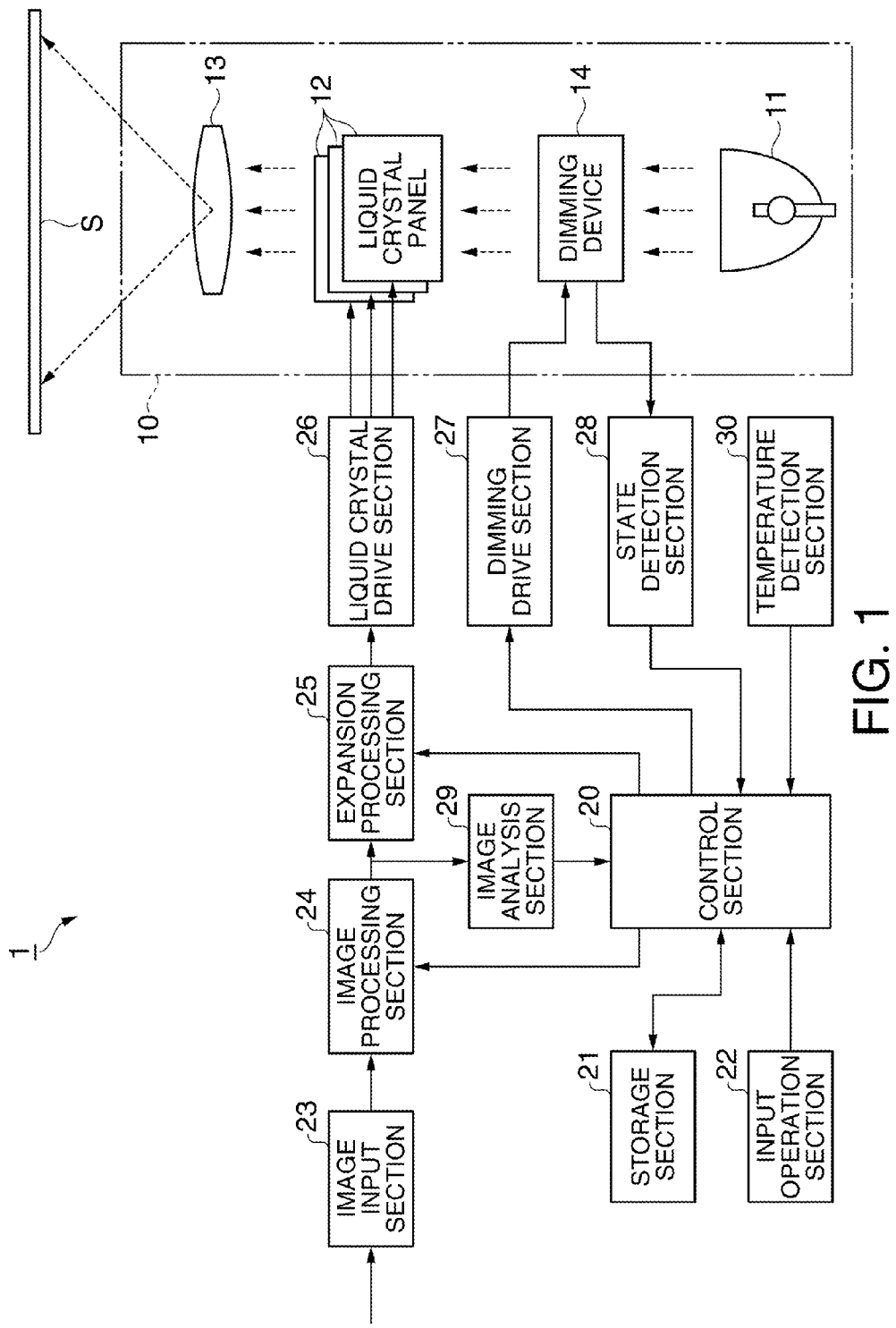
FIG. 1 is a block diagram illustrating a schematic configuration of a projector.

FIG. 1 is a block diagram illustrating a schematic configuration of a projector.

As shown in FIG. 1, a projector 1 includes an image projection portion 10, a control section 20, a storage section 21, an input operation section 22, an image input section 23, an image processing section 24, an expansion processing section 25, a liquid crystal drive section 26, a dimming drive section 27, a state detection section 28, an image analysis section 29, a temperature detection section 30, and the like.

The image projection portion 10 is constituted by a light source device 11 used as a light source, three liquid crystal panels 12 used as a light modulation device, a projection lens 13 used as a projection optical system, a dimming device 14, and the like. The image projection portion 10 is equivalent to an image display portion, and modulates light emitted from the light source device 11 into image light using the liquid crystal panel 12 and projects the image light from the project lens 13 to display an image on an external screen S or the like.

Figure 2:
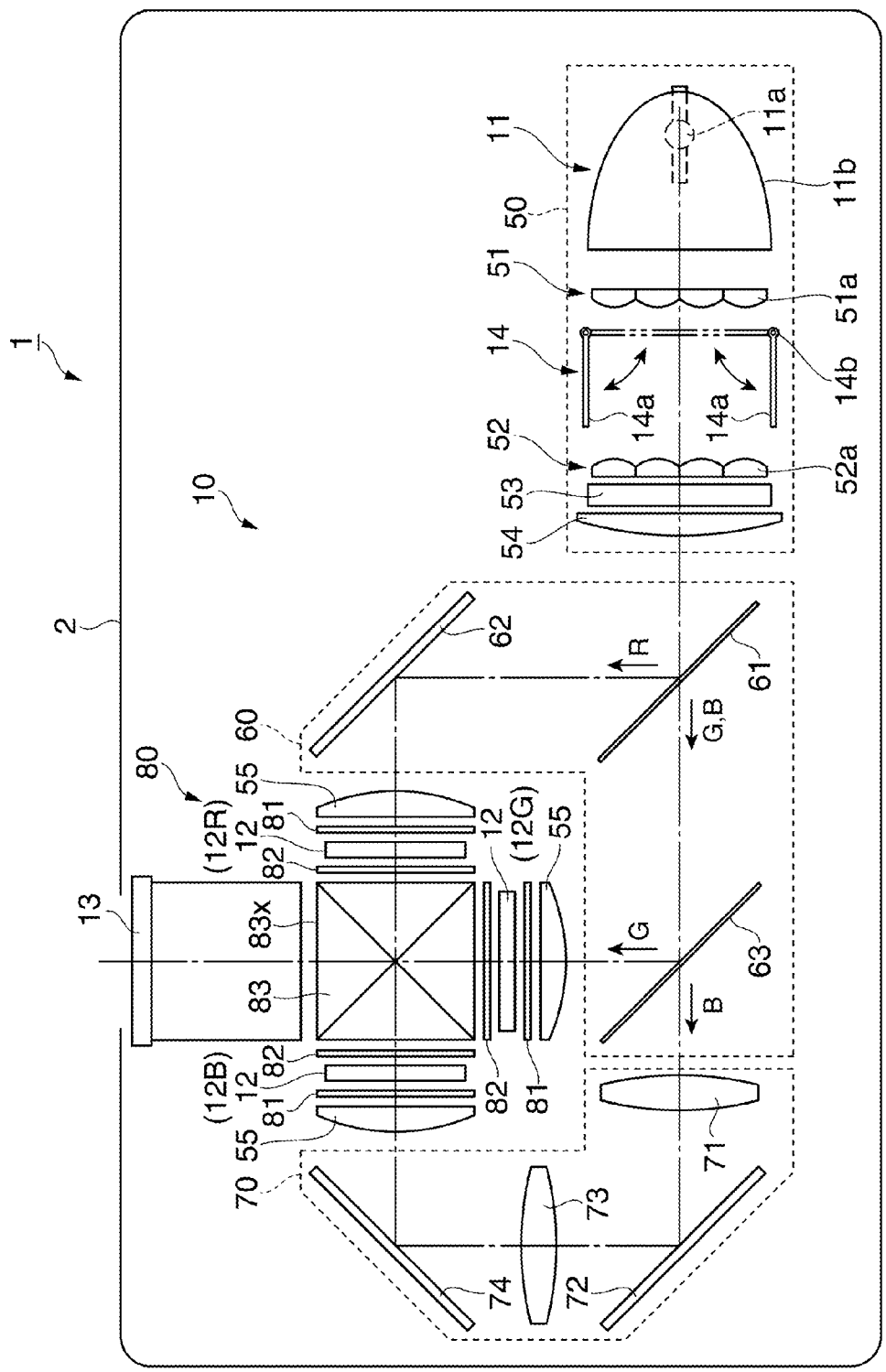
FIG. 2 is a configuration diagram illustrating a configuration of an image projection portion in more detail.

FIG. 2 is a configuration diagram illustrating a configuration of the image projection portion 10 in more detail, and shows a light path until the light emitted from the light source device 11 reaches the projection lens 13.

As shown in FIG. 2, the image projection portion 10 includes an illumination optical system 50 having the light source device 11, the dimming device 14 and the like, a color light separation optical system 60, a relay optical system 70, an image forming portion 80 having the liquid crystal panel 12 and the like, and the projection lens 13, and they are accommodated in a housing 2 which forms the exterior of the projector 1.

The illumination optical system 50 includes the light source device 11, a first lens array 51, a second lens array 52, a polarization conversion element 53, a superposition lens 54, and the dimming device 14. The light source device 11 includes a discharge-type light source lamp 11a such as an extra-high pressure mercury lamp and a metal halide lamp, and a reflector 11b such as a concave-shaped ellipsoidal mirror, and the light source lamp 11a is installed at the inside of the reflector 11b. A radial light flux emitted from the light source lamp 11a is reflected from the reflector 11b, and is emitted to the first lens array 51.

The first lens array 51 and the second lens array 52 are configured such that micro-lenses 51a and 52a are respectively disposed in a matrix. A light flux incident from the light source device 11 is divided into a plurality of micro partial light fluxes by the first lens array 51. The second lens array 52 and the superposition lens 54 are configured such that each of the partial light fluxes divided by the first lens array 51 irradiates the entirety of the liquid crystal panel 12 which is an object to be illuminated. For this reason, each of the partial light flux is superposed in the liquid crystal panel 12, and the entirety of the liquid crystal panel 12 is illuminated substantially uniformly.

The dimming device 14 including a pair of louvers 14a which are opened and closed in a hinged door manner is disposed at a light path between the first and second lens arrays 51 and 52. The louver 14a is formed of a light-shielding member that shields light, and the dimming device 14 moves the louver 14a to adjust an open and closed state, thereby allowing the amount of light emitted from the light source device 11 to be adjusted (regulated). That is, the dimming device 14 shields a portion of the light fluxes divided by the first lens array 51 using the louver 14a to restrict the amount of light, and thus the amount of light that illuminates the liquid crystal panel 12 in accordance with the amount of light regulated by the dimming device 14, that is, the amount of image light projected is reduced substantially uniformly. Meanwhile, when the louver 14a of the dimming device 14 is opened to the utmost, light emitted from the first lens array 51 reaches the second lens array 52 without being shielded by the louver 14a. As the louver 14a is gradually closed, the amount of light reaching the second lens array 52 decreases. When the louver 14a is blocked to the utmost, most of the light emitted from the first lens array 51 is shielded by the louver 14a.

The polarization conversion element 53 can efficiently use light from the light source device 11 in the liquid crystal panel 12, and thus has a function of uniformizing polarized light with a specific polarization direction. Polarized light emitted from the illumination optical system 50 is incident on the color light separation optical system 60.

The color light separation optical system 60 includes a first dichroic mirror 61, a first reflective mirror 62, and a second dichroic mirror 63, and separates light emitted from the illumination optical system 50 into three color light components having different wavelength regions. The first dichroic mirror 61 reflects substantially red light (red light R), and transmits light having a wavelength smaller than the red light R. The red light R reflected from the first dichroic mirror 61 is further reflected in the first reflective mirror 62, and is parallelized by a parallelizing lens 55 to illuminate a liquid crystal panel 12R for red light of the image forming portion 80.

The second dichroic mirror 63 transmits substantially blue light (blue light B), and reflects light having a wavelength longer than the transmitted light. For this reason, substantially green light (green light G) in light passing through the first dichroic mirror 61 is reflected by the second dichroic mirror 63, and is parallelized by the parallelizing lens 55 to illuminate a liquid crystal panel 12G for green light of the image forming portion 80. In addition, the blue light B passes through the second dichroic mirror 63 and is incident on the relay optical system 70. After the blue light goes through the relay optical system 70, the light is parallelized by the parallelizing lens 55 and illuminates a liquid crystal panel 12B for blue light of the image forming portion 80.

Meanwhile, since the path of the blue light B is longer than the paths of other colored light components, the relay optical system 70 is provided in order to suppress a decrease in the efficiency of illumination of the liquid crystal panel 12B due to the diffusion of the light flux. The relay optical system 70 includes a lens 71 on the incident side, a second reflective mirror 72, a relay lens 73, and a third reflective mirror 74, and the blue light B incident on the relay optical system 70 converges in the vicinity of the relay lens 73 through the lens 71 on the incident side, and is diffused toward the parallelizing lens 55.

The image forming portion 80 includes three liquid crystal panels 12 (liquid crystal panel 12R for red light, liquid crystal panel 12G for green light, and liquid crystal panel 12B for blue light), a polarizing plate 81 on the incident side and a polarizing plate 82 on the emission side which are respectively disposed at the incident side and the emission side of each liquid crystal panel 12, and a cross-dichroic prism 83 used as a color synthesis optical system.

The liquid crystal panel 12 includes a pair of transparent substrates in which liquid crystals are sealed, and transparent electrodes (pixel electrodes) capable of applying a drive voltage to the liquid crystals for each micro region (pixel) are formed in the inner surface of the transparent substrate in a matrix. The polarizing plate 81 on the incident side and the polarizing plate 82 on the emission side can transmit only polarized light having a specific polarization direction, and the polarizing plate 81 on the incident side can transmit polarized light having a polarization direction which is uniformized by the polarization conversion element 53. For this reason, most of each colored light emitted toward the liquid crystal panel 12 passes through the polarizing plate 81 on the incident side, and is incident on the liquid crystal panel 12.

Here, when a drive voltage based on image information which is input from the outside is applied to each pixel of the liquid crystal panel 12 by the liquid crystal drive section 26 (see FIG. 1), light incident on the liquid crystal panel 12 is modulated in accordance with the drive voltage, and becomes polarized light having a polarization direction which is different for each pixel. Only polarized components, capable of passing through the polarizing plate 82 on the emission side, in the polarized light are emitted from the polarizing plate 82 on the emission side. That is, the liquid crystal panel 12 and the polarizing plate 82 on the emission side transmits incident light at transmittance which is different for each pixel in accordance with image information, so that image light having a gradation is formed for each colored light. The image light composed of each of the colored light components emitted from the polarizing plate 82 on the emission side is incident on the cross-dichroic prism 83.

A dielectric multilayer film that reflects blue light and a dielectric multilayer film that reflects red light are provided in the cross-dichroic prism 83 in a substantial X-shape along the interfaces of four rectangular prisms, the image light of each color emitted from the polarizing plate 82 on the emission side is synthesized by the dielectric multilayer films. The image light synthesized by the cross-dichroic prism 83 is emitted from an emission plane 83$x$ as colored image light, and is incident on the projection lens 13.

The projection lens 13 is disposed at the emission plane 83$x$ side of the cross-dichroic prism 83, and enlarges and projects the image light formed by the image forming portion 80. The image light emitted from the projection lens 13 is projected onto the external screen S (see FIG. 1) or the like.

Referring back to FIG. 1, the control section 20 includes a CPU (Central Processing Unit) which is not shown and a RAM (Random Access Memory), not shown, used for temporarily storing various types of data and the like, and the CPU operates in accordance with a control program stored in the storage section 21 to thereby integrally control the operation of the projector 1. That is, the control section 20 functions as a computer together with the storage section 21.

The storage section 21 is constituted by a mask ROM (Read Only Memory), or a nonvolatile memory such as a flash memory. A control program for controlling the operation of the projector 1, various types of data that specify operating conditions of the projector 1, or the like is stored in the storage section 21.

The input operation section 22 is used in receiving a user's input operation, and includes a plurality of operation keys in order for a user to perform various types of instructions with respect to the projector 1. When a user operates various types of operation keys of the input operation section 22, the input operation section 22 receives the input operation, and an operation signal based on user's operation details is output to the control section 20. Meanwhile, as the input operation section 22, a remote controller (not shown) capable of performing a remote operation may be used. In this case, the remote controller sends out an infrared operation signal based on the user's operation details, and the operation signal is received by a receiving portion which is not shown and is transferred to the control section 20.

Image information is input to the image input section 23 from external image supply devices, not shown, such as a personal computer and various types of image reproduction devices. The image input section 23 performs an A/D conversion process or the like, as necessary, on the input image information, and outputs the image information after the process to the image processing section 24.

The image processing section 24 converts the image information which is input from the image input section 23 into image information expressing a gradation of each pixel of the liquid crystal panel 12. Here, the converted image information is classified by colored light components of R, G, and B, and is composed of a plurality of pixel values corresponding to all the pixels of each liquid crystal panel 12. The pixel value is to set the light transmittance of the corresponding pixel, and the strength (gradation) of light emitted from each pixel is specified by the pixel value. In addition, the image processing section 24 performs a quality adjustment process for adjusting brightness, a contrast or the like, an OSD process for superposing and displaying OSD (on-screen display) images such as a menu image and a message image, or the like, as necessary, on the converted image information on the basis of the instructions of the control section 20, and outputs image information after the process to the expansion processing section 25 and the image analysis section 29.

The expansion processing section 25 performs an expansion process for expanding the gradation range, on each pixel value of the image information which is input from the image processing section 24, on the basis of the control of the control section 20. The expansion processing section 25 outputs image information after the process to the liquid crystal drive section 26.

The liquid crystal drive section 26 drives the liquid crystal panel 12 in accordance with the image information which is input from the expansion processing section 25. As a result, an image based on the image information is projected onto the screen S from the image projection portion 10.

The dimming drive section 27 is constituted by a driving device such as a stepping motor, and drives the dimming device 14 on the basis of the control of the control section 20. Specifically, the dimming drive section 27 opens and closes the louver 14*a* by rotating a rotation shaft 14*b* (see FIG. 2) of the louver 14*a* by an angle based on the control of the control section 20. The dimming device 14 can adjust the open and closed state of the louver 14*a* in a multistage manner between a fully open state where the louver is opened to the utmost and a fully closed state where it is blocked to the utmost. Meanwhile, in order to smooth the opening and closing operation of the louver 14*a* through the dimming drive section 27 and reduce an operation sound, grease (lubricant) is applied to an area of the dimming device 14 (for example, a toothed wheel which is not shown) to which motive power is transferred from the dimming drive section 27.

The state detection section 28 detects the adjustment state (dimming state) of the amount of light using the dimming device 14, that is, the open and closed state of the louver 14*a*, and outputs a detection result to the control section 20. The state detection section 28 may be able to detect the dimming state approximately. Thus, the state detection section 28 can be configured using a press switch, a photo-reflector or the like which is switched on or off depending on the open and closed state of the louver 14*a*, and can also be configured using other detection devices such as a rotary encoder.

The image analysis section 29 analyzes image information which is input from the image processing section 24, derives a feature amount based on the brightness of an image (pixel value of each pixel) for each one frame, and outputs the feature amount to the control section 20. As the feature amount, for example, the maximum pixel value (white peak value) which is the brightest pixel value within one frame, or APL (Average Picture Level) representing average luminance within one frame is derived. The control section 20 instructs the expansion processing section 25 to expand the pixel value on the basis of the feature amount which is input from the image analysis section 29, and instructs the dimming drive section 27 to drive the dimming device 14. For example, when it is shown that the input feature amount is darker than a predetermined brightness, the control section 20 instructs the expansion processing section 25 to perform a process of expanding the pixel value to the white side, and instructs the dimming drive section 27 to block the louver 14*a* by the amount of expansion of the pixel value. As a result, since the image can be displayed with proper brightness (darkness) by regulating the amount of light, and the range (gradation range) of the pixel value used within one frame is extended, contrast perception is improved. Meanwhile, in the specification, the control of the dimming state of the dimming device 14 by the control section 20 on the basis of the analysis result of the image analysis section 29 is also expressed a "dimming control".

The temperature detection section 30 is constituted by a thermistor and the like, and detects the internal temperature of the projector 1, that is, the internal temperature of the housing 2 to output the detection result to the control section 20. Meanwhile, the temperature detection section 30 is preferably installed at a position capable of detecting the temperature of the dimming device 14 or its peripheral area.

Next, operations of the projector 1 will be described.

Figure 3:
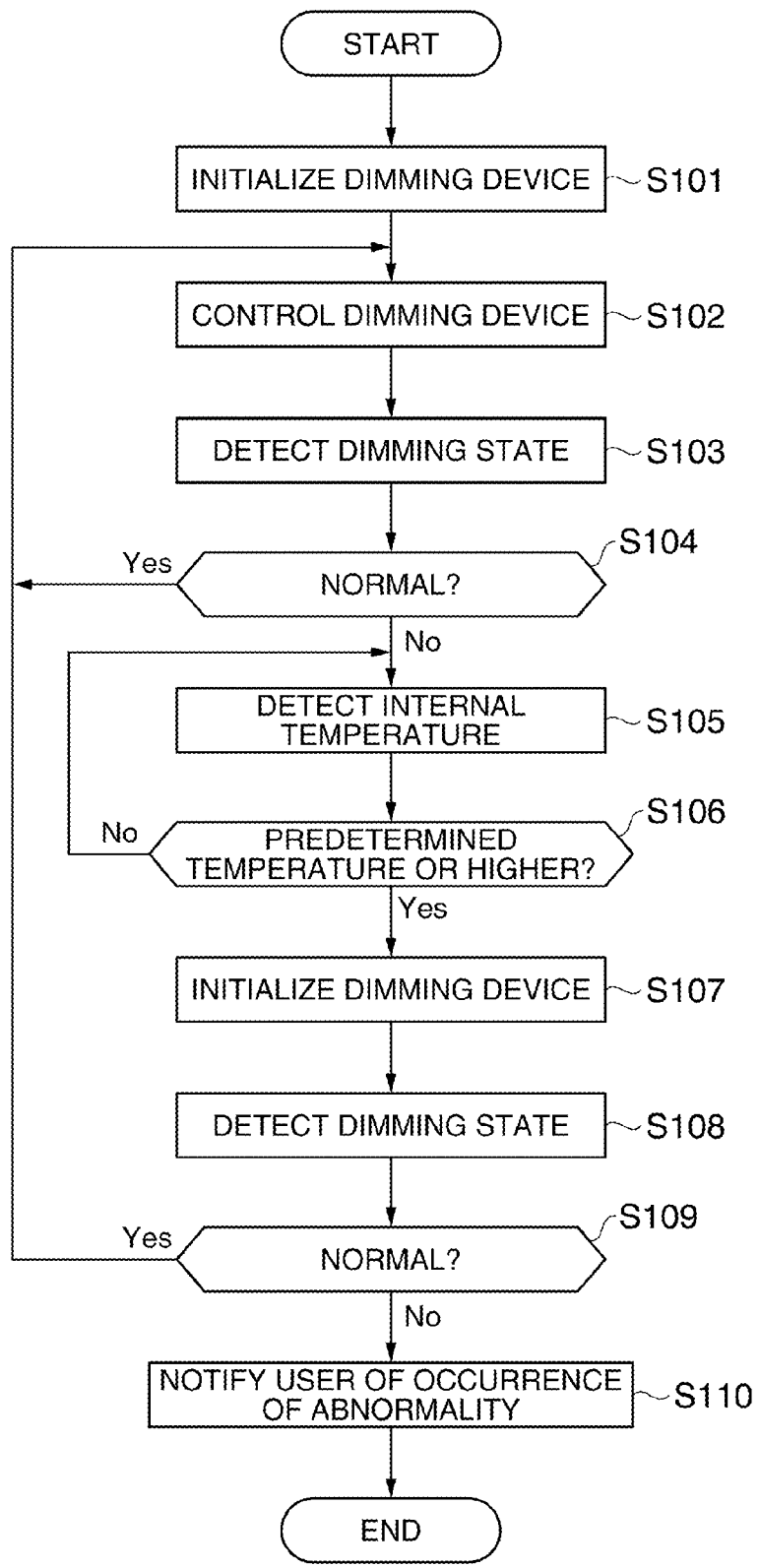
FIG. 3 is a flow diagram illustrating operations relating to a control of a dimming device in a first embodiment.

FIG. 3 is a flow diagram illustrating operations relating to a control of the dimming device 14. When a power key of the input operation section 22 is operated and power is switched from OFF to ON, the projector 1 starts the projection of an image by turning on the light source device 11. The control section 20 operates in accordance with a flow shown in FIG. 3.

As shown in FIG. 3, in step S101, the control section 20 performs an initialization process for starting a dimming control. Specifically, the control section 20 causes the dimming drive section 27 to drive the dimming device 14, and sets the dimming state of the dimming device 14, that is, the open and closed state of the louver 14a to a predetermined initial state. Meanwhile, in order to set the dimming device 14 to be in the initial state, the dimming device 14 may be driven so as to be in the initial state while detecting the dimming state in the state detection section 28. However, when the state detection section 28 cannot detect the dimming state with a high degree of accuracy, for example, the louver 14a is blocked sufficiently and is set to be in the fully closed state, and then may be opened by the amount required to be set to be in the initial state. Alternatively, after the louver 14a is opened sufficiently and is set to be in the fully open state, it may be blocked by the amount required to be set to be in the initial state.

In step S102, the control section 20 causes the expansion processing section 25 to perform an expansion process in accordance with the analysis result of the image analysis section 29, that is, the light and darkness of image to be projected, and performs control (dimming control) of the dimming device 14 using the dimming drive section 27. At this time, the control section 20 controls the dimming state of the dimming device 14 on the basis of the initial state which is set by initialization. That is, the control section 20 controls the adjustment state of the dimming device 14 (open and closed state of the louver 14a) using the difference from the set initial state (for example, difference in the rotational angle of the rotation shaft 14b).

In step S103, the control section 20 causes the state detection section 28 to detect the dimming state of the dimming device 14, and in step S104, the control section 20 determines whether the control of the dimming device 14 is normally performed on the basis of the detection result of the state detection section 28. That is, the control section 20 determines whether the dimming state of the dimming device 14 detected by the state detection section 28 is set to a normal dimming state as controlled. When the control is normal, the flow returns to step S102, and the dimming control (step S102), the detection of the dimming state (step S103), and the determination of whether the normal control is performed (step S104) are periodically repeated. In the meantime, an image is projected in a state where a correct dimming control is performed from the image projection portion 10. On the other hand, when the control is not normal, that is, when the dimming state detected by the state detection section 28 is set to an abnormal dimming state contrary to the control, the flow goes to step S105.

In step S105, the control section 20 causes the temperature detection section 30 to detect the internal temperature of the projector 1, and in step S106, determines whether the detected temperature is equal to or higher than a predetermined temperature. When the detected temperature is equal to or higher than a predetermined temperature, the flow goes to step S107. In addition, when the detected temperature is lower than a predetermined temperature, the flow returns to step S105, and the detection of the internal temperature (step S105) and the determination of whether the detected internal temperature is equal to or higher than a predetermined temperature (step S106) are periodically repeated. Meanwhile, when the internal temperature of the projector 1 is equal to or higher than a predetermined temperature, the above-mentioned predetermined temperature is set so that grease applied to the dimming device 14 acts properly. When the internal temperature thereof is lower than the predetermined temperature, there is a possibility of interference with the opening and closing operation of the dimming device 14 due to hardening of grease (increase in viscosity and hence decrease in fluidity). In addition, when the projector 1 is used under the low-temperature environment, the internal temperature of the projector 1 has a tendency to be lower than the predetermined temperature immediately after the projector starts up (immediately after power is turned on). However, since the temperature gradually rises through the operation of the light source device 11 to be turned on or each section, it is set to equal to or higher than the predetermined temperature with the lapse of time.

When the internal temperature of the projector 1 is equal to or higher than the predetermined temperature and the flow goes to step S107, the control section 20 initializes the dimming device 14 similarly to step S101, and set the dimming state of the dimming device 14 to the initial state.

In step S108, the control section 20 causes the state detection section 28 to detect the dimming state of the dimming device 14, and in step S109, the control section 20 determines whether the dimming device 14 is normally initialized on the basis of the detection result of the state detection section 28. That is, the control section 20 determines whether the dimming state of the dimming device 14 detected by the state detection section 28 is set to the dimming state of the initial state. When the normal initialization is performed, the flow returns to step S102, the expansion process is restarted, and the control (driving) of the dimming device 14 is restarted. As a result, an image is projected from the image projection portion 10 in a state where the correct dimming control is performed. On the other hand, the flow goes to step S110 in a case of the failure of the initialization.

When the flow goes to step S110, the control section notifies a user of the occurrence of an abnormality. Specifically, the control section 20 instructs the image processing section 24 to superpose and display the OSD images including a message (error message) stating that there is an abnormality in the dimming device 14. After the error message is displayed for a predetermined time, the power of the projector 1 is turned off, and the flow is terminated.

The projector 1 of the embodiment operates as mentioned above, and thus grease applied to the dimming device 14 hardens under the low-temperature environment. When the dimming device 14 does not operate normally, the abnormality thereof is detected in step S104. Even in this case, when the internal temperature of the projector 1 is set to equal to or higher than the predetermined temperature with the lapse of time, the viscosity of grease is set to a proper state, and the dimming device 14 can operate normally. For this reason, the control section 20 performs the initialization again in step S107 after the internal temperature is equal to or higher than the predetermined temperature, and restarts the dimming control returning to step S102 when the dimming state detected in step S108 is normal. On the other hand, when the dimming state is not normal even in the case where the internal temperature of the projector 1 becomes equal to or higher than the predetermined temperature, the occurrence of abnormalities other than the abnormality caused by the hardening of grease is considered, and thus the power of the projector 1 is turned off after a user is notified of the occurrence of the abnormality through an error message.

As described above, according to the projector 1 of the embodiment, the following effects can be obtained.

(1) According to the projector 1 of the embodiment, when the temperature detected by the temperature detection section 30 is equal to or higher than the predetermined temperature, the initialization process for starting the control of the dimming device 14 is performed, and thus the dimming device 14 can be controlled properly unlike the case in which the initialization is performed in a state where the temperature is low, that is, grease applied to the dimming device 14 hardens.

(2) According to the projector 1 of the embodiment, after the projector 1 is started up, the dimming device 14 is initialized regardless of the internal temperature thereof and the dimming control is started. When the abnormality occurs in the control, the internal temperature thereof is detected, and the initialization is performed again after the internal temperature becomes equal to or higher than the predetermined temperature. That is, when the frequency of use under the low-temperature environment is low because the internal temperature is not detected immediately after the startup, a proper dimming control can be started immediately.

(3) According to the projector 1 of the embodiment, when the control of the dimming device 14 is not normal, the initialization of the dimming device 14 is performed after the internal temperature is equal to or higher than the predetermined temperature, and thus it is not necessary to repeat useless initialization under the low-temperature environment. Here, in the configuration in which the fully open state or the fully closed state is set at the time of the initialization, the brightness of the image changes every time the initialization is performed, and thus a user is given a feeling of discomfort. However, according to the projector 1 of the embodiment, the frequency thereof can be reduced.

Meanwhile, in the embodiment, step S105 is equivalent to a temperature detection step, step S107 is equivalent to an initialization step, step S104 is equivalent to a first determination step, step S109 is equivalent to a second determination step, and step S102 is equivalent to a control start step.

Second Embodiment

Hereinafter, a projector according to a second embodiment will be described with reference to the accompanying drawings. The projector 1 according to the embodiment has the same configuration as that of the first embodiment, but the operations of the control of the dimming device 14 are different from those in the first embodiment.

Figure 4:
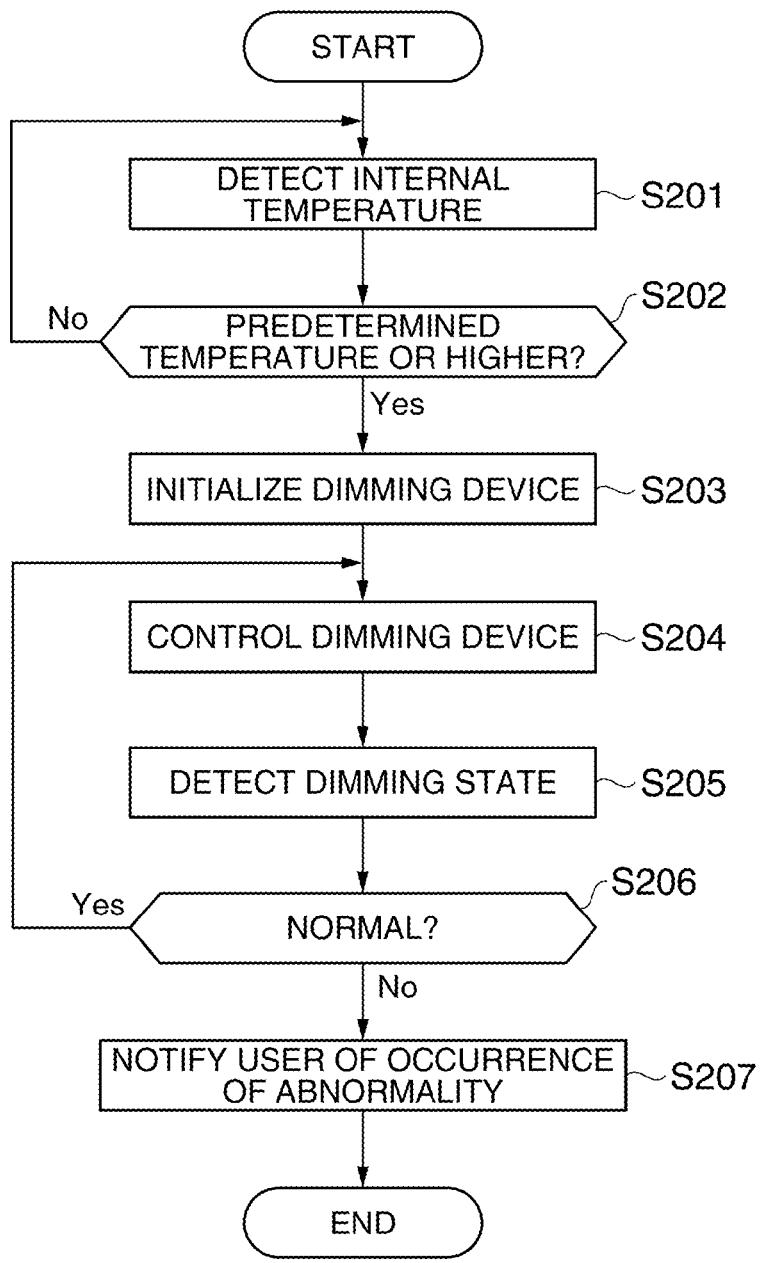
FIG. 4 is a flow diagram illustrating operations relating to a control of a dimming device in a second embodiment.

FIG. 4 is a flow diagram illustrating operations relating to control of the dimming device 14 in the embodiment. When a power key of the input operation section 22 is operated and power is switched from OFF to ON, the projector 1 starts the projection of an image by turning on the light source device 11. The control section 20 operates in accordance with a flow shown in FIG. 4.

As shown in FIG. 4, in step S201, the control section 20 causes the temperature detection section 30 to detect the internal temperature of the projector 1, and in step S202, determines whether the detected temperature is equal to or higher than the predetermined temperature. When the detected temperature is equal to or higher than the predetermined temperature, the flow goes to step S203. In addition, when the detected temperature is lower than the predetermined temperature, the flow returns to step S201, the detection of the internal temperature (step S201) and the determination of whether the detected internal temperature is equal to or higher than the predetermined temperature (step S202) are periodically repeated.

When the internal temperature is equal to or higher than the predetermined temperature and the flow goes to step S203, the control section 20 causes the dimming drive section 27 to drive the dimming device 14, the dimming state of the dimming device 14, that is, the open and closed state of the louver 14a is initialized to a predetermined initial state.

In step S204, the control section 20 causes the expansion processing section 25 to perform an expansion process in accordance with the analysis result of the image analysis section 29, that is, the brightness and darkness of the project image, and performs the control (dimming control) of the dimming device 14 using the dimming drive section 27. Thereafter, an image is projected from the projector 1 with a good quality in which contrast perception is improved.

In step S205, the control section 20 causes the state detection section 28 to detect the dimming state of the dimming device 14, and in step S206, the control section 20 determines whether the control of the dimming device 14 is normally performed on the basis of the detection result of the state detection section 28. That is, the control section 20 determines whether the dimming state of the dimming device 14 detected by the state detection section 28 is set to the dimming state as controlled. When the control is normal, the flow returns to step S204, and the dimming control (step S204), the detection of the dimming state (step S205), and the determination of whether the normal control is performed (step S206) are periodically repeated. In the meantime, an image is projected from the image projection portion 10 in a state where a correct dimming control is performed. On the other hand, when the control is not normal, that is, when the dimming state detected by the state detection section 28 is set to an abnormal dimming state contrary to the control, the flow goes to step S207.

In step S207, the control section 20 notifies a user of the occurrence of an abnormality. Specifically, the control section 20 instructs the image processing section 24 to superpose and display the OSD images including a message (error message) stating that there is an abnormality in the dimming device 14. After the error message is displayed for a predetermined time, the power of the projector 1 is turned off, and the flow is terminated.

As described above, according to the projector 1 of the embodiment, the following effects can be obtained.

(1) According to the projector 1 of the embodiment, since the internal temperature is detected at the time of the startup of the projector 1, and the dimming control is started by performing the initialization process because the internal temperature becomes equal to or higher than the predetermined temperature, it is possible to suppress the occurrence of the abnormal control caused by hardening of grease of the dimming device 14 under the low-temperature environment.

Meanwhile, in the embodiment, step S201 is equivalent to a temperature detection step, and step S203 is equivalent to an initialization step.

Modification Example

In addition, the above-mentioned embodiment may be changed as follows.

In the above-mentioned embodiment, the dimming device 14 has a configuration in which the louver 14a opened and closed in a hinged door manner is included, but the configuration of the dimming device 14 is not limited thereto. For example, the opening and closing may be performed in a sliding door (sliding) manner, and a configuration may be adopted in which the size of an aperture is adjusted using a plurality of diaphragm blades as in a diaphragm mechanism used in a camera.

In the above-mentioned first embodiment, the dimming device 14 is initialized before the dimming device 14 is controlled, but the initialization may be omitted and the dimming device 14 may be controlled. As in the above-mentioned embodiment, when the state detection section 28 cannot detect the dimming state of the dimming device 14 with a high degree of accuracy, the dimming device 14 is required to be initialized and set to be in the initial state. However, when the state detection section 28 can detect the present position of the louver 14a with a high degree of accuracy, the initialization process can be omitted, the dimming device 14 can be controlled on the basis of the control amount of the dimming device 14, and whether the dimming control is normally performed on the basis of the position (dimming state) of the louver 14a detected by the state detection section 18 can be determined. When it is determined that the dimming control is not normally performed, the dimming control may not be performed until the internal temperature becomes equal to or higher than the predetermined temperature. Similarly, in the second embodiment, when the internal temperature becomes equal to or higher than the predetermined temperature, the dimming control may be started without performing the initialization process.

In the above-mentioned first embodiment, after the initialization of the dimming device 14 is performed in step S107, whether the dimming device 14 is normally initialized is determined in step S109, and the power is turned off by displaying an error message when the dimming device is not normally initialized. However, before the error message is displayed, the initialization may be repeated several times.

In the above-mentioned embodiment, the three-plate type projector 1 making use of three liquid crystal panels 12 has been described, but the embodiment is not limited thereto. For example, the embodiment can also be applied to the single-plate type projector 1 capable of modulating R light, G light, and B light in one liquid crystal panel.

In the above-mentioned embodiment, although the transmissive liquid crystal panel 12 is used as a light modulation device, a reflective light modulation device such as a reflective liquid crystal panel can also be used. In addition, it is also possible to use a micro-mirror array device or the like that modulates light emitted from the light source by controlling the emission direction of incident light for each micro-mirror used as a pixel.

In the above-mentioned embodiment, although the light source device 11 includes the discharge-type light source lamp 11a, a solid-state light source such as an LED (Light Emitting Diode) light source, or other light sources can also be used.

What is claimed is:

1. A projector that modulates and projects light emitted from a light source in accordance with image information, comprising:
    a dimming device that moves a light-shielding member for shielding light to adjust the amount of light emitted from the light source;
    a housing that accommodates the dimming device;
    a temperature detection section that detects an internal temperature of the housing; and
    a control section that controls an adjustment state of the amount of light through the dimming device,
    wherein the control section starts control of the dimming device when the temperature detected by the temperature detection section is set to equal to or higher than a predetermined temperature.

2. The projector according to claim 1, wherein an initialization process is performed when the control of the dimming device is started, and the initialization process is a process of setting the adjustment state of the dimming device to a predetermined initial state.

3. The projector according to claim 2, further comprising a state detection section that detects the adjustment state of the dimming device,
    wherein the control section determines whether the control of the dimming device is normally performed on the basis of a detection result of the state detection section, and performs the initialization process when the control of the dimming device is determined not to be normal.

4. The projector according to claim 2, further comprising a state detection section that detects the adjustment state of the dimming device,
    wherein the control section determines whether the initialization process is normally performed on the basis of a detection result of the state detection section after the initialization process is performed, and starts the control of the dimming device when the initialization process is normally performed.

5. A method of controlling a projector including an image projection portion that modulates and projects light emitted from a light source in accordance with image information, a dimming device that moves a light-shielding member for shielding light to adjust the amount of light emitted from the light source, a housing that accommodates the dimming device, and a control section that controls an adjustment state of the amount of light through the dimming device, the method comprising:
    detecting an internal temperature of the housing; and
    starting control of the dimming device through the control section when the temperature detected in the temperature detection is set to equal to or higher than a predetermined temperature.

6. The method of controlling a projector according to claim 5, wherein initialization is performed when the control of the dimming device is started, and the adjustment state of the dimming device is set to a predetermined initial state in the initialization.

7. The method of controlling a projector according to claim 6, further comprising firstly determining whether the control of the dimming device is normally performed,
    wherein in the initialization, the initialization process is performed when the control of the dimming device is determined not to be normal in the first determination.

8. The method of controlling a projector according to claim 6, further comprising:
    secondly determining whether the initialization process is normally performed after the initialization; and
    starting the control of the dimming device when the initialization process is determined to be normally performed in the second determination.

9. A projector that modulates and projects light emitted from a light source through a modulation section in accordance with image information, comprising:
    a dimming device, having a movable light-shielding member for shielding light, which drives the light-shielding member to adjust the amount of light emitted from the light source and input to the modulation section; and a control section that drives the light-shielding member to control an adjustment state of the amount of light, wherein a lubricant is applied to a movable portion of the dimming device, and the control section performs control so as not to move the light-shielding member of the dimming device until an internal temperature of the projector is set to equal to or higher than a predetermined temperature and a lubrication action of the lubricant is effective when the lubricant is solidified.

* * * * *